Patented May 25, 1954

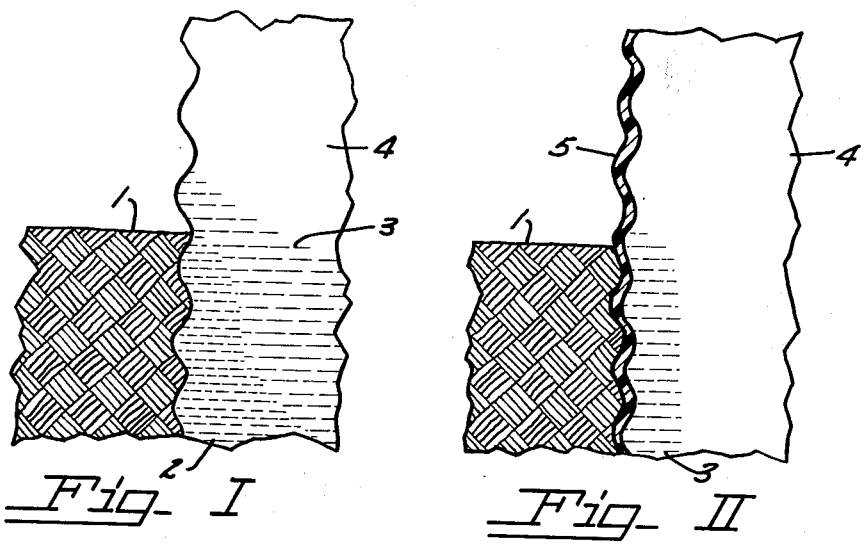
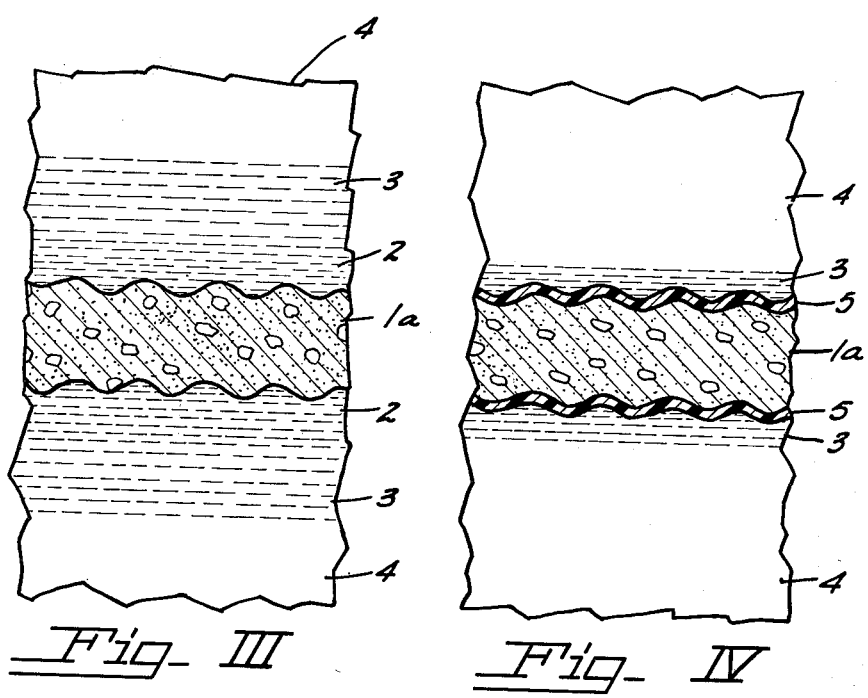

2,679,495

UNITED STATES PATENT OFFICE 2,679,495

SILOXANE WATERPROOFING COMPOSITIONS OF SUPERIOR PERMANENCY

Raymond H. Bunnell, Toledo, Ohio, assignor, by mesne assignments, to Allied Chemical & Dye Corporation, New York, N. Y., a corporation of New York Application August 7, 1950, Serial No. 178,055

7 Claims. (Cl. 260—46.5)

The invention relates to the waterproofing of articles, particularly porous ceramic materials, by forming a water-repellent coating thereon.

The method heretofore used for increasing the water resistance of porous ceramic materials has consisted in applying to the surfaces of such ceramic materials a solution of aluminum stearate in a volatile solvent. Such treatment of the surfaces imparts water-repellency, but the water-repellency so imparted disappears after a relatively short period of months or years. Subsequent penetration of water, followed by freezing, then results in gradual weathering and disintegration of the ceramic material.

The principal object of the invention is the production of water-repellent coatings of superior permanency. More specific objects and advantages are apparent from the description in which reference is had to the accompanying drawings illustrating preferred embodiments of the invention.

Figure I of the drawings is an enlarged fragmentary cross-sectional view of a normal building foundation and moist earth adjacent thereto.

Figure II is a view that is the same as Figure I except that the foundation has been treated in accordance with the method of the invention.

Figure III is an enlarged fragmentary cross-sectional view of masonry units held together by mortar as in a normal building structure.

Figure IV is a view that is the same as Figure III, except that the masonry units have been treated in accordance with the method of the invention.

These specific drawings and the specific description that follows merely illustrate and disclose but are not intended to limit the invention.

The present invention is based upon the discovery that certain unique and unexpected results can be produced by the use of a certain combination of ingredients, including a secondary alkyl-silane, in certain specific proportions to produce waterproofing compositions. A waterproofing composition embodying the invention, which has improved stability and forms water-repellent coatings of superior permanency, comprises a substance having an average unit structure corresponding to the formula.

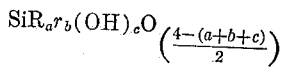

wherein R is a radical having from three to nine carbon atoms in which a secondary acyclic carbon atom is attached to the silicon atom; r is a primary alkyl radical having from one to six carbon atoms; a is a number from 0.3 to 0.75; b is a number from 0 to 0.9; the sum of a and b is not greater than 1.2; and not less than about 30 per cent of the silicon atoms have secondary alkyl radicals attached thereto.

A substance having such an average unit structure is a substance of the type known as a siloxanol. The siloxanols that have been commonly known heretofore have been those containing lower alkyl radicals (usually methyl radicals and occasionally ethyl radicals). A siloxanol having an average unit structure corresponding to the above formula would be a relatively unstable substance if the alkyl radicals were methyl radicals. Such a methyl siloxanol usually is prepared just before use and is cured by baking.

The superior permanency of water-repellent coatings produced in the practice of the invention is due to the presence of secondary alkyl radicals. The use of a secondary alkylsilane as one of the ingredients in the preparation of a coating composition embodying the invention has been found to produce a remarkable improvement in the stability of the composition toward gelling or curing. This effect greatly facilitates the preparation of the composition because it greatly reduces the danger that the composition may be spoiled by gelling during its preparation. The use of a secondary alkylsilane as an ingredient in the preparation of a waterproofing composition embodying the invention produces a remarkable improvement in the permanency of water-repellent coatings produced from the composition, apparently by arresting condensation in the coating so as to prevent the coating from becoming brittle or disintegrating on prolonged exposure to the weather.

If the value of a in the average unit structure of the siloxanol were greater than 0.75, the siloxanol would produce unsatisfactory results because of its tendency to remain permanently in a tacky condition instead of producing a solid coating. If the value of a were below 0.3, the siloxanol would not be sufficiently stable.

The superior permanency of water-repellent coatings produced from compositions embodying the invention has been demonstrated as follows:

Common sand mold bricks, which in the untreated state absorb a large amount of water, were allowed to stand for at least one week in a conditioning room in which the temperature was 70 degrees F. and the relative humidity was 50 per cent. The bricks were then brushed clean of loose particles and were treated on one flat side and on the four edges with one of the waterproofing compositions specified in the first column of Table 1 below. The coating was applied to each brick using a paint brush one and one-half inches wide, the coverage being equivalent to about 100 square feet of surface per gallon (an average of 15 to 25 grams of solution per brick). The coated bricks were permitted to dry in air at room temperature for at least one week, and were then weighed to determine the initial or dry weight. The bricks were then placed treated side down in a trough containing water at a depth of one-quarter inch. (This depth of water corresponds roughly to the pressure exerted by a 20 M. P. H. breeze.) At the end of four hours, the bricks were removed from the trough, wiped free of superficial moisture, and weighed. They were then returned to the trough. At the end of twenty-four hours (i. e., twenty additional hours in the trough) they were reweighed. From the increase in weight of each brick, the water absorbed by the brick after four hours and after twenty-four hours was calculated, as per cent of its former weight. (The terms "per cent" and "parts" are used herein to mean per cent and parts by weight unless otherwise specified.) Ten bricks were used to test each waterproofing composition, and the average of the ten results is given in the second and third columns of Table 1 below, as the per cent of water absorbed after four hours and after twenty-four hours. (For the sake of comparison the results obtained upon testing untreated bricks in the same manner are also included in Table 1.)

The durability of the various waterproofing materials shown in Table 1 was tested by means of an accelerated weather exposure test, which consisted in placing the bricks in a deep freeze (0 degrees F.) for twenty-four hours, removing them and immediately placing them in an oven at a temperature of 150 degrees F. for twenty-four hours, and then testing for water absorption after four and after twenty-four hours in the trough of water. The whole cycle (i. e., placing the bricks in the deep freeze, then in the oven, and then in the trough of water for four hours, weighing, replacing them in the trough for an additional twenty hours, and reweighing) was repeated until the average of the water absorption results on the ten bricks treated with each waterproofing composition showed that the composition was no longer effective. (A waterproofing composition is considered herein to be no longer effective, i. e., to fail in the accelerated weather exposure test, when the water absorption after twenty-four hours in the trough is as high as approximately 2 per cent.) The fourth column in Table 1 below shows, in each case, the number of the cycle in which the water absorption results shown in the fifth and sixth columns (after four and after twenty-four hours in the trough of water) were obtained.

Composition A in Table 1 is a composition embodying the invention which was prepared as follows:

A mixture of pentenes (1.19 mols, comprising a high percentage of 2-pentene) and silicochloroform (1 mol) were pumped into an opening at the bottom of a reactor which consisted of a vertical tube approximately twenty inches in length, having an internal diameter of about five inches. The length of the reactor was surrounded by electrically heated coils, covered with asbestos packing, which maintained the temperature in the reactor at approximately 370 degrees C. The reactants were permitted to remain in the reactor for approximately one hour, during which time the pressure inside the reactor was about 1,000 pounds per square inch gauge. The reactor was cooled to room temperature, and the products formed were removed and fractionally distilled through a jacketed column four feet in length packed with glass helices. The products recovered included a 48 per cent yield (based on the pentene) of a sec.-amyltrichlorosilane, B. P. 165-170 degrees C. at atmospheric pressure, as well as unreacted silicochloroform and pentenes.

A mixture of a sec.-amyltrichlorosilane (123 grams prepared by the procedure described in the preceding paragraph), ethyltrichlorosilane (33 grams), silicon tetrachloride (34 grams) and butyl acetate (300 ml.) was added dropwise from a dropping funnel to water (500 ml.), contained in a 4-liter beaker surrounded with ice water which cooled the water in the beaker to a temperature between 0 and 5 degrees C. The mixture in the beaker was stirred during the addition, and the rate of addition was adjusted so that the temperature of the mixture in the beaker never rose higher than about 5 degrees C. When the addition from the dropping funnel, which required approximately one hour, was complete, the resinous layer was separated from the water layer in a separatory funnel, and the water layer was drawn off. The resin was placed in a Claisen flask and distilled to remove the solvents and water. The resin was then bodied by heating under reduced pressure at a temperature of about 230 degrees C. for approximately one and one-half hours. The resulting bodied resin was diluted with "Varnolene" (a fraction obtained in the distillation of petroleum, boiling between 310 degrees F. and 410 degrees F., which consists substantially of high boiling aliphatic hydrocarbons) to a 1.5 per cent solids concentration. For the sake of comparison the results obtained using three control compositions B, C and D to treat bricks by the procedure hereinbefore described are also included in Table 1. Control B was a commercial waterproofing solution comprising approximately 4 per cent of aluminum stearate which is sold under the name "Driwal." (This composition was applied to bricks in two coats as well as one coat.) Control C was a commercial waterproofing composition having a 7 per cent solids content which is sold under the name "Hydrocide-Colorless D." (This composition was applied to bricks in two coats.) Controls D was a commercial waterproofing composition which comprises 1 per cent of a silicone and is sold under the name "Crystal."

Table 1

| Water-proofing Composition | Initial Test, Percent Water Absorbed | | Cycle Test No. | Percent Water Absorbed | |
|---|---|---|---|---|---|
| | 4 hrs. | 24 hrs. | | 4 hrs. | 24 hrs. |
| A | .096 | .149 | 27 | ------ | .241 |
| B—Control | .025 | .170 | 12 | 1.916 | 8.204 |
| B—Control, 2 coats | .188 | .293 | 23 | .987 | 1.958 |
| C—Control, 2 coats | .133 | .133 | 17 | 1.0 | 3.034 |
| D—Control | .188 | .268 | 27 | .753 | 2.647 |
| (untreated brick) | 18.73 | 18.86 | ------ | ------ | ------ |

As the results of the initial water absorption tests on treated and untreated bricks shown in columns 2 and 3 in Table 1 indicate, composition A embodying the invention and control compositions B, C and D are initially all highly effective waterproofing agents. However, the permanency of composition A under severe weathering conditions is substantially greater than the permanency of the control compositions. Composition D, which is more effective than the other control compositions, fails in the 27th cycle, whereas composition A is still highly effective in this cycle. Even when applied in two coats, compositions B and C fail in the 23rd and 17th cycles respectively.

*Organosiloxanol*

For the sake of brevity, a substance having an average unit structure corresponding to the formula $$SiR_a r_b (OH)_c O_{\left(\frac{4-(a+b+c)}{2}\right)}$$

wherein R is a radical having from three to nine carbon atoms in which a secondary acyclic carbon atom is attached to the silicon atom; $r$ is a primary alkyl radical having from one to six carbon atoms; $a$ is a number from 0.3 to 0.75; $b$ is a number from 0 to 0.9; the sum of $a$ and $b$ is not greater than 1.2; and not less than about 30 per cent of the silicon atoms have secondary alkyl radicals attached thereto, is referred to hereinafter as an "organosiloxanol."

"Acyclic carbon atoms" as used herein means a carbon atom which is not contained in a ring system, i. e., is contained in an acyclic radical (a straight or branched chain monovalent aliphatic radical having saturated $$-\underset{|}{\overset{|}{C}}-\underset{|}{\overset{|}{C}}-$$

bonds) or in the acyclic part of an aryl-substituted acyclic radical. Thus, a radical having from three to nine carbon atoms in which a secondary acyclic carbon atom is attached to a silicon atom (R in the above formula) may be any straight or branched chain secondary alkyl radical having from three to nine carbon atoms (i. e., an isopropyl, a secondary butyl or any secondary amyl, hexyl, heptyl, octyl or nonyl radical); or an aralkyl radical having not more than nine carbon atoms which consists of (1) a primary alkyl radical having from two to three carbon atoms in which one hydrogen atom that is attached to the carbon atom connected to the free valence has been replaced by an aryl radical having from six to seven carbon atoms and having no substituents or having from one to three nuclear substituents each of which is a halogen of atomic weight less than 80 (i. e., chlorine, bromine or fluorine); or (2) an isopropyl radical in which a hydrogen atom in the beta position has been replaced by such an aryl radical. Such aralkyl radicals include alpha phenylethyl, alpha-tolylethyls, alpha-phenylpropyl, alpha-(chlorophenyl)ethyls, alpha - (trichlorophenyl)ethyls, alpha - (dichlorophenyl)ethyls and alpha - (dichlorophenyl)-propyls.

A primary alkyl radical having from one to six carbon atoms ($r$ in the above formula) may be a straight or branched chain primary alkyl radical having from one to six carbon atoms (i. e., a methyl, ethyl, 1-propyl, 1-butyl, isobutyl, 1-pentyl, isoamyl, 1-hexyl or isohexyl radical).

*Silane starting materials*

The organosiloxanol coating compositions embodying the invention may be produced by the controlled hydrolysis and condensation of a mixture of silanes which includes one or more secondary alkyl (or aralkyl) silanes having the general formula $$RSiY_3$$

either (1) one or more silanes having the general formula $$SiY_4$$

(hereinafter referred to as tetra-functional silanes), or (2) one or more primary alkyl silanes having the general formula $$r_x SiY_{(4-x)}$$

or both (1) and (2). In the formulas R is a secondary alkyl or aralkyl radical having from three to nine carbon atoms, as hereinfore described, Y is a hydrolyzable radical, $r$ is a primary alkyl radical having from one to six carbon atoms, as hereinbefore described and $x$ is an integer from one to two. "Hydrolyzable radical" is used herein to include halo, alkoxy, amino, aroxy and acyloxy. The halo radical is any one having an atomic weight less than 80. The alkoxy radical is any primary or secondary alkoxy radical having from one to four carbon atoms (i. e., methoxy, ethoxy, propoxy, isopropoxy, n-butoxy, isobutoxy or secondary butoxy). Amino is simply the —NH₂ group. Aroxy radicals are any in which the aryl group is phenyl, or a mono-, di- or tri-substituted phenyl radical, each substituent being a primary, secondary or tertiary alkyl radical having from one to five carbon atoms, the total number of carbon atoms in the side chains being not more than five (i. e., the aryl radical is phenyl, or ortho-, meta- or para-methyl phenyl, any di- or tri-methyl phenyl, or any substituted phenyl in which the substituents are: one ethyl; one ethyl and one methyl; two ethyls; two methyls and one ethyl; two ethyls and one methyl; either propyl radical; either propyl radical and methyl; either propyl radical and two methyls; either propyl radical and ethyl; any butyl radical; any butyl radical and methyl; or any pentyl radical). The acyloxy radical has the general formula $$\underset{\overset{\|}{O}}{Z-C-O-}$$

in which Z is a saturated or unsaturated straight, branched or closed chain hydrocarbon radical having from one to eighteen carbon atoms, or phenyl or substituted phenyl, the substituents, if any, consisting of from one to three alkyl radicals each having from one to five carbon atoms, and all having a total of not more than five carbon atoms, as hereinbefore described.

Examples of secondary alkyl (or aralkyl) silanes that may be used as starting materials in the production of organosiloxanol coating compositions embodying the invention include: isopropyltrichlorosilane, secondary butyltrichlorosilane, secondary amyltrichlorosilanes, secondary hexyltrichlorosilanes, secondary octyltrichlorosilanes, secondary nonyltrichlorosilanes, alpha-tolylethyltrichlorosilanes, alpha-phenylethyltrichlorosilane, and alpha-(chlorophenyl)ethyltrichlorosilanes. An aralkylsilane which is trihalo-substituted on the aryl nucleus (e. g., a beta-(trichlorophenyl)ethyltrichlorosilane) when used in the production of compositions of the invention imparts flame resistance to the water-repellent coatings produced from such compositions.

Examples of tetra-functional silanes that may be used as starting materials in the production of organosiloxanol coating compositions embodying the invention include: ethyl orthosilicate, propyl orthosilicate, butyl orthosilicate, phenyl orthosilicate, silicon tetrachloride, silicon tetrafluoride and silicon tetrabromide.

Examples of primary alkylsilanes that may be used as starting materials in the production of organosiloxanol compositions of the present invention include: methyltrichlorosilane, ethyltriethoxysilane, ethyltrichlorosilane, 1 - propyltrichlorosilane, 1-propyltrifluorosilane, 1-propyltriethoxysilane, dipropyldichlorosilane, 1-butyltrichlorosilane, isobutyltrichlorosilane, 1-butyltriethoxysilane, isobutyltriethoxysilane, 1-butyltributoxysilane, dibutyldichlorosilane, 1-pentyltrichlorosilane, isoamyltrichlorosilane, 1-pentyltrifluorosilane, 1-pentyltriethoxysilane, diamyldifluorosilane, 1-hexyltrichlorosilane and 1-hexyltriethoxysilane.

Preparation of silane starting materials

Primary and secondary mono-alkyltrihalosilanes that may be used in the present method may be prepared by a reaction between an alkene having from 2 to 9 carbon atoms and a silicohaloform. Silanes that are produced by such reaction have alkyl radicals derived from alkenes by the addition of a hydrogen atom to one of the carbon atoms linked by the double bond in the alkene molecule, the free valence being attached to the other of the carbon atoms linked by the double bond in the alkene. Alkenes that may be used in such a reaction include: ethylene, propene, 1- and 2-butenes, 1- and 2-pentenes, 1-, 2- and 3-hexenes, 1-, 2- and 3-heptenes, 1-, 2-, 3- and 4-octenes, and 1-, 2-, 3- and 4-nonenes.

Monoalkyl- or dialkyl-halo- or alkoxy-silanes may be prepared by means of a Grignard reaction between a silicon tetrahalide or alkyl orthosilicate and an alkyl magnesium halide. Such reactions proceed at a faster rate at elevated temperatures and are usually exothermic in nature. It is ordinarily desirable, therefore, to conduct the reaction in a vessel equipped with a heating coil and cooling means (e. g., a reflux condenser) so that the reactants can be heated to such a temperature that the reaction proceeds at a substantial rate, and then the maximum output of heat generated by the reaction can be removed through the cooling means. It is usually desirable to conduct the reaction in the presence of diethyl ether as a solvent; the ether has the double effect of initiating the Grignard reaction and of facilitating control of the temperature in the reaction vessel. The reaction proceeds less readily with alkoxysilanes than it does with halosilanes so that it may be desirable to conduct the reaction between an alkyl magnesium halide and an alkyl orthosilicate under somewhat more drastic conditions than are usually desirable when the reaction is conducted with a tetrahalosilane.

Monoalkylsilanes having hydrolyzable radicals that are alkoxy groups having from one to four carbon atoms are preferably prepared by a procedure which consists in reacting the corresponding alkyltrihalosilane with a primary or secondary aliphatic alcohol whose molecule contains from one to four carbon atoms (e. g., methanol, ethanol, 1-propanol, isopropyl alcohol, or 1- or 2-butanol). In such a reaction it is necessary to use fairly high reaction temperatures since alkyltrihalosilanes are somewhat less reactive than the corresponding silicon tetrahalides. At these higher temperatures the HCl evolved during the reaction tends to react with the alkoxysilane products to give alkyl chlorides and partially condensed siloxanes. It is desirable, therefore, to use carbon tetrachloride or chloroform as a solvent to assist in the rapid removal of HCl from the reaction zone. It is desirable to use about a 10 per cent excess of the alcohol over the number of mols theoretically required to react with all of the alkyltrihalosilane, and to add the alcohol to a solution (at room temperature) of the alkyltrihalosilane in a volume of carbon tetrachloride or chloroform approximately equal to the volume of the alcohol. The rate of alcohol addition should be such that HCl is not evolved too vigorously. As HCl is evolved the temperature drops spontaneously to about 10 degrees C. After the addition of the alcohol is complete, the mixture is refluxed for three to four hours with stirring. The reaction mixture is then distilled from a small amount of anhydrous sodium or potassium carbonate (to prevent "bumping" during the distillation). Such a procedure ordinarily gives approximately a 90 per cent yield of the alkyltrialkoxysilane.

Aralkylsilanes which may be used as starting materials may be prepared by reacting the corresponding halo-substituted alkylsilane (e. g., alpha-chloroethyltrichlorosilane or alpha-chloropropyltrichlorosilane) with an aromatic hydrocarbon (e. g., benzene, toluene, a mono-, di- or tri-halobenzene or a mono-, di- or tri-halotoluene) in the presence of an aluminum halide catalyst in which each halogen atom has an atomic weight between 35 and 80 (i. e., chlorine or bromine). In such a reaction the halogen atom is split out of the haloalkyl radical in the silane molecule and a hydrogen atom is split out of the aromatic nucleus in the aromatic hydrocarbon molecule so that the two reacting molecules are linked into a single molecule by a

bond. It is preferred that the molar ratio of the aromatic compound to the haloalkyltrihalosilane be approximately 3 to 1, and that the proportion of the aluminum halide catalyst be between .75 and 2 mol per cent (based on the amount of the haloalkyltrihalosilane present in the reaction mixture). Usually, about ¼ to ⅓ of the total amount of the aluminum halide is added very carefully at room temperature to the mixture of silane and aromatic hydrocarbon, which is then heated for about 20 minutes. The remainder of the aluminum halide is then added in portions large enough to maintain a fairly vigorous rate of reaction, with heating between additions, and after the entire amount of the aluminum halide has been added, the reaction mixture is refluxed for the length of time necessary to complete the reaction and drive off HCl. When the reaction goes rather slowly, the heating may be continued while the remainder of the aluminum halide is added in small portions. It is usually desirable to remove the aluminum halide catalyst before distillation to obtain the pure aralkyltrihalosilane. Aluminum chloride may be removed by adding phosphorus oxychloride to the reaction mixture. The phosphorus oxychloride binds the aluminum chloride by reacting with it to form a stable complex. An amount of phosphorus oxychloride equivalent to the amount of aluminum chloride present in the reaction mixture (or in slight excess over the amount of aluminum chloride) is added to the reaction mixture when the mixture has cooled to a temperature slightly below the boiling point of phosphorus oxychloride (107 degrees C.). After further cooling an amount of a hydrocarbon solvent equal to the volume of the reaction mixture is added to precipitate the AlCl₃.POCl₃ complex. Such hydrocarbon solvents include pentane, ligroin and petroleum ethers. The mixture is allowed to stand over night, and the solid complex is filtered from the solution or the liquid to be distilled is decanted from the mixture, leaving a residue containing the AlCl₃.POCl₃ complex. An absorbing agent such as kieselguhr may be added in place of or in addition to the hydrocarbon solvent to absorb the AlCl₃.POCl₃ complex, and after the reaction mixture cools to room temperature the liquid to be distilled may be filtered from the absorbed complex. There is less chance that aluminum chloride will distill with the product when it is in the form of a complex than when it is in the free state, and when this complex is relatively non-volatile as compared to the organosilane product the product may be distilled under reduced pressure in the presence of the AlCl₃.POCl₃ complex.

Silanes having, attached to the silicon atom in the silane molecule, one or more amino radicals are produced by reaction between ammonia and an appropriate silane having one or more halo radicals attached to the silicon atom in the silane molecule. By such a reaction halo is replaced by NH₂; alkylsilanes containing amino groups as hydrolyzable radicals can be prepared by such a reaction.

Silanes having hydrolyzable radicals which consist of acyloxy groups are produced by reaction between an acid anhydride and appropriate silanes having hydrolyzable radicals which consist of alkoxy groups, or, in some instances, by reaction between an appropriate silane having hydrolyzable halo radicals and the sodium salt of the suitable organic acid.

Silanes having aroxy radicals attached to the silicon atom in the silane molecule are prepared by reaction between the corresponding halosilane and phenol or monoalkyl-, dialkyl- or trialkyl-substituted phenols in which each alkyl substituent has from one to five carbon atoms, and all the alkyl substituents contain a total of not more than five carbon atoms as hereinbefore described.

*Molecular structure of organosiloxanol*

In the production of organosiloxanol compositions embodying the invention, the silane starting materials are hydrolyzed and the hydrolyzable radicals are removed during the first step of hydrolysis. Thus, it does not matter what hydrolyzable radicals are present in the silane starting materials. The significant radical for the purposes of the present invention is —OH, and any radical that is replaced upon hydrolysis by —OH can be used in the practice of the present invention. The least expensive and most readily available hydrolyzable radicals are usually preferred, but the by-products formed in the hydrolysis reaction may also govern the choice of hydrolyzable radicals. For example, since vapors from methoxysilanes are highly toxic it is usually not desirable to hydrolyze silane mixtures in which the hydrolyzable radicals are methoxy radicals. The most desirable hydrolyzable radicals are ethoxy and chloro radicals.

It is desirable that all hydrolyzable radicals in any one mixture of silanes used in the production of compositions of the invention be the same. Halo radicals are more readily hydrolyzed than amino, acyloxy and alkoxy radicals so that the hydrolysis of, for example, a mixture of a secondary amyltrihalosilane with ethyl orthosilicate is not as readily controllable as the hydrolysis of, for example, a mixture of a secondary amyltrihalosilane with silicon tetrachloride (or silicochloroform) or a mixture of a secondary amyltriethoxysilane with ethyl orthosilicate.

The molecular structure of the organosiloxanols embodying the invention depends in part upon the average number of hydrolyzable radicals in the silane starting materials employed in their production. ("Average number of hydrolyzable radicals," as used herein, signifies the total number of hydrolyzable radicals attached to the silicon atoms in the molecules of the silane starting materials divided by the total number of silicon atoms therein.) This fact may be expressed in another way by saying that the molecular structure of the siloxanols depends upon the average number of non-hydrolyzable radicals attached to the silicon atoms in the silane molecules. The ratio $r/Si$ in which $r$ is the total number of non-hydrolyzable radicals attached to silicon atoms in the molecules of the siloxanols and $Si$ is the total number of silicon atoms therein, represents the average number of non-hydrolyzable radicals.

In general, the ratio of the total number of non-hydrolyzable radicals (i. e., primary and secondary alkyl (or aralkyl) radicals) to the total number of silicon atoms in the molecular structure of an organosiloxanol composition of the invention (i. e., the $r/Si$ ratio or the sum of $a$ and $b$ in the formula given above corresponding to the average unit structure of an organosiloxanol) is at least about 0.3 and is not higher than about 1.2. The $r/Si$ ratio of an alkylsiloxanol of the invention is not less than 0.3, since at least 30 per cent of the silicon atoms in the alkylsiloxanol molecules must have secondary alkyl (or aralkyl) radicals (as hereinbefore described) attached thereto, as hereinafter further discussed. If the $r/Si$ ratio were higher than 1.2, the alkylsiloxanol composition would be too tacky or oil-like to form the water-repellent coatings of superior permanency that are one of the chief objects of the present invention, as hereinafter further discussed. The preferred alkylsiloxanols embodying the invention are those having an $r/Si$ ratio between about 0.5 and about 0.9, in which not less than about 50 per cent of the silicon atoms have secondary alkyl (or aralkyl) radicals attached thereto.

It is preferable that the $r/Si$ ratios of compositions of the invention be progressively lower as the number of carbon atoms in the secondary alkyl radicals attached to silicon atoms approaches nine. Resins in which the $r/Si$ ratio is in the higher portion of the range hereinbefore described are increasingly difficult to body sufficiently to form satisfactorily non-tacky coatings as the number of carbon atoms in each secondary alkyl radical increases from about six to about nine. Secondary amylsilanes are particularly useful in the production of the present compositions since they are inexpensively prepared and may be used to produce organosiloxanols of any desired $r/Si$ ratio within the ranges hereinbefore described.

The reactions which occur in the production of organosiloxanol coating compositions embodying the invention by the controlled hydrolysis and condensation of a mixture of silanes, as hereinbefore described, are believed to be represented by Equations 1 and 2 below:

(1) $\quad -Si-Y + H_2O \longrightarrow -Si-OH + HY$ (2) 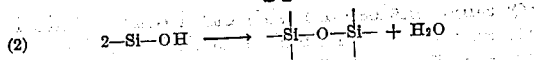

in which Y is a hydrolyzable radical as hereinbefore described. Usually at least partial condensation (i. e., a reaction corresponding to Equation 2 above) accompanies or follows immediately the hydrolysis. However, it is possible to conduct the hydrolysis reaction in such a way that complete condensation does not follow immediately the hydrolysis reaction, so that liquid, hydrolyzed and only partially condensed silanols (i. e., siloxanols) can be isolated after the hydrolysis reaction. In the practice of the present invention the resulting siloxanols are embodied by heating to a viscosity high enough so that films of the resin form substantially hard, gum-like, tack-free coatings. The presence of secondary alkyl groups attached to silicon atoms in the molecules of compositions of the inventiin makes it possible to body such compositions vigorously without danger of gelling. Although the bodied compositions are in a substantially cured state, they are not completely condensed resins. Some OH groups attached to silicon atoms are still present in the bodied compositions since they are soluble in the volatile solvents hereinafter described. In the formula for the average unit structure of the organosiloxanols the average number of OH groups per silicon atom is represented by the letter "c". Although the numerical value of "c" is not known, it is believed that it tends to remain constant and does not vary to any appreciable extent when a solution of a composition embodying the invention is allowed to stand under ordinary atmospheric conditions over a long period of time. That is, since the compositions are bodied at relatively high temperatures until they reach a substantially cured state (i. e., a highly condensed stable state), the compositions are not prone to further condensation after they are cooled to ordinary temperatures. Thus, the coatings produced from such stable compositions, which have excellent water-repellency, also have superior permanency, as hereinbefore demonstrated, since there is apparently little tendency for the OH groups attached to silicon atoms in the coating molecules to condense over long periods of time under exposure to severe weathering conditions, and the coatings remain flexible and last indefinitely without deteriorating. Coating compositions produced from organosiloxanols in which only primary alkyl radicals are attached to silicon atoms do not have the stability which makes for the remarkable permanency of coating compositions of the invention, since the former compositions cannot be bodied to a substantially cured condition without gelling, and over a period of time coatings produced from such compositions gradually undergo further condensation until they become brittle and crack and disintegrate.

At least 30 per cent of the silicon atoms in the molecules of compositions of the invention must have secondary alkyl (or aralkyl) radicals attached thereto so that the compositions will not gel during preparation. It is preferable that at least 50 per cent of the silicon atoms in compositions of the invention be attached to secondary alkyl (or aralkyl) radicals. However, secondary alkyl (or aralkyl) silanes should not comprise more than about 75 mole per cent of the silanes used in the preparation of the present compositions, since the presence of too many secondary alkyl radicals makes the compositions too tacky and oil-like, even after vigorous bodying, to form satisfactory coatings. It is preferable that secondary alkyl (or aralkyl) silanes comprise not more than about 70 mole per cent and most desirable that they comprise not more than about 60 mols per cent of the silanes used in the preparation of the present compositions.

*Preparation of organosiloxanol*

Although organosiloxanol compositions embodying the invention may be prepared from mixtures comprising only secondary alkyl (or aralkyl) silanes and tetra-functional silanes but no primary alkylsilanes (the r/Si ratio of such compositions cannot, of course, be higher than 0.75), such compositions may contain some gel particles. The difference in the rates of hydrolysis of tetra-functional silanes and secondary alkyl (or aralkyl) silanes is believed to be great enough that some of the tetra-functional silane molecules may hydrolize and condense with each other before they can co-condense with hydroxy groups derived from the more slowly hydrolyzed secondary alkylsilanes, so that the resulting composition may contain some gel particles (or some emulsification, which makes separation of water and resin layers after a hydrolysis reaction difficult). This can be substantially avoided, however, by using primary alkylsilanes in addition to the secondary silanes and tetra-functional silanes. (It is believed that the rate of hydrolysis of primary alkylsilanes in which the alkyl radicals have from one to six carbon atoms is intermediate between the rates of hydrolysis of tetra-functional silanes and secondary alkyl (or aralkyl) silanes, so that the presence of the primary alkylsilanes tends to "bridge" this difference in hydrolysis rates.) The products of the hydrolysis of primary alkylsilanes in which the alkyl radical has from one to six carbon atoms gel upon bodying in the presence of heat, whereas the products of the hydrolysis of secondary alkyl (or aralkyl) silanes even after vigorous bodying remain tacky and oil-like. Thus, it has been found that the use of a primary alkylsilane in which the alkyl radical has from one to six carbon atoms in combination with a secondary alkyl (or aralkyl) silane in the production of the present compositions permits the compositions to be bodied to a relatively high viscosity without gelling. The preferred primary alkyl radicals are methyl, ethyl and propyl radicals since the lower alkylsilanes give greater body to the present resins. Although primary alkylsilanes may comprise as high as about 70 mole per cent of the mixture of silanes used in the production of the present resins, usually it is preferable that they comprise not more than about 40 mole percent of the mixture of silanes, and it is most desirable that they comprise not more than about 20 mole per cent of the mixture of silanes.

The primary alkylsilane starting materials used in the production of the present compositions may include dialkylsilanes. However, it is preferable, in the production of compositions of the invention having an r/Si ratio greater than 1, that the dialkylsilanes employed comprise not more than about 20 mole per cent and preferably not more than about 10 mole per cent of the silane starting materials. Although such limited amounts of dialkylsilanes may be employed in the production of the compositions of the invention which have an r/Si ratio less than 1, it is ordinarily preferable that any primary alkylsilanes employed be monoalkylsilanes, not only because they are much less expensive than dialkylsilanes, but also because they are more effective in giving body to the resins and in preventing the formation of gel particles. (It is believed that the dialkylsilanes are not as effective in "bridging" the difference between the rates of hydrolysis of tetra-functional silanes and secondary alkylsilanes.) Trialkylsilanes are undesirable as starting materials in the practice of the invention since they act as "blocking agents" and prevent the formation of the desired siloxanols.

Other silanes, such as arylsilanes, and primary or secondary halo-substituted alkylsilanes in which there are not more than three halogen atoms per alkyl radical and in which each halogen atom has an atomic weight less than 80 and is attached to a carbon atom which is not in the beta-position in an alkyl radical, may be employed in the preparation of the present composition in limited amounts (e. g., from about 10 to about 20 mole per cent of the silane starting materials). (Beta-haloalkylsilanes cannot be used, since under the hydrolysis conditions hereinafter described they tend to decompose, with the splitting off of an olefin from the silane molecule). The use of large amounts of arylsilanes, e. g., phenyltrichlorosilane, is undesirable since it not only may make coatings produced from a composition of the invention brittle, but also adds to the cost of the composition. The use of large amounts of haloalkylsilanes in the preparation of a composition of the invention should be avoided since such a composition may be applied as a water-repellent coating on a ceramic material, and there is danger that such silanes may liberate HCl, which would, of course, be harmful to the ceramic material.

If desired, the tetra-functional silanes used in the production of the present compositions may comprise small amounts of silanes having the general formula $$SiHY_3$$

wherein Y is a hydrolyzable radical, as hereinbefore defined. The amount of such silane starting materials (which include, e. g., silicochloroform and triethoxysilane) used in the production of an organosiloxanol composition of the invention should be such that the number of hydrogen atoms per silicon atom is not higher than about one-sixth the total number of non-hydrolyzable organic radicals (i. e., primary and secondary radicals) per silicon atom in the average unit structure of the resulting organosiloxanol. The use of larger amounts of silanes such as silicochloroform in the production of organosiloxanols which are to be bodied to relatively hard, non-tacky resins may cause gelling of the resins. Slightly larger amounts (e. g., amounts such that the number of hydrogen atoms is approximately one-fourth the total number of non-hydrolyzable organic radicals per silicon atom) may be used without causing gelling in compositions of the invention which are bodied very briefly (e. g., ten to fifteen minutes at a temperature of about 220 degrees C.).

*Hydrolysis*

Compositions embodying the invention are most desirably prepared by a method that includes either (1) the hydrolysis of a mixture of a secondary alkyl (or aralkyl) triethoxysilane with ethyl orthosilicate and/or a primary monoalkyltriethoxysilane, or (2) the hydrolysis of a mixture of a secondary alkyl (or aralkyl) trichlorosilane with silicon tetrachloride and/or a primary monoalkyltrichlorosilane, the molar proportions of the silanes, of course, being such as to give an organosiloxanol having the desired $r/Si$ ratio and the desired properties. Both methods (1) and (2) appear to be equally suitable for the preparation of alkylsiloxanols having an $r/Si$ ratio of about 0.6 or higher. The hydrolysis of a mixture comprising an alkyltrichlorosilane is advantageous in that an alkyltrichlorosilane is more readily prepared than an alkyltriethoxysilane (alkyltriethoxysilanes are usually prepared by reacting ethyl alcohol with the corresponding alkyltrichlorosilane). However, a dilute solution of hydrochloric acid is obtained as a by-product from such a hydrolysis reaction, which causes disposal problems as well as loss of hydrogen chloride. On the other hand, although the hydrolysis of a mixture comprising an alkyltriethoxysilane involves an extra processing step in the preparation of the ethoxysilane, anhydrous hydrogen chloride may be recovered from the preparation of the ethoxysilane and reused, for example, in the preparation of silicochloroform. Furthermore, organosiloxanols embodying the invention of any desired $r/Si$ ratio may be prepared by hydrolysis of a mixture comprising an alkyl (or aralkyl) triethoxysilane and ethyl orthosilicate, whereas organosiloxanols having an $r/Si$ ratio lower than 0.6 cannot be readily prepared by the hydrolysis of a mixture comprising an alkyl (or aralkyl) trichlorosilane and silicon tetrachloride since silicon tetrachloride hydrolyzes rapidly and gels when the number of hydrolyzable radicals in the mixture to be hydrolyzed is high.

When the hydrolyzable radicals in a mixture of silanes to be hydrolyzed in the preparation of organosiloxanol compositions of the invention are less readily hydrolyzable than halo radicals (e. g., ethoxy radicals), a carefully controlled hydrolysis reaction may be conducted, as hereinafter described, in a hydrolyzing solution of an inorganic acid in water, using a mutual solvent for the silanes and the hydrolyzing solution.

When the hydrolyzable radicals in the mixture of silanes to be hydrolyzed in the preparation of organosiloxanol compositions of the invention are readily hydrolyzable radicals such as halo radicals (e. g., chloro radicals), the hydrolyzing agent may be water alone, the hydrolysis being conducted in the presence of a suitable solvent for the silanes, as hereinafter discussed.

The carefully controlled hydrolysis reaction by which the present organosiloxanols are obtained may be conducted by adding the mixture of silanes to the hydrolyzing solution at a rate sufficiently slow that the exothermic hydrolysis reaction does not cause local overheating (i. e., at such a rate that one mole of silanes is added in from about 10 to about 20 minutes). It is usually desirable that the hydrolyzing solution be stirred during the silane addition; otherwise, local overheating may result in spite of a slow rate of silane addition. It is often desirable to hydrolyze halosilanes with a water-ice slurry; the hydrolysis producing a hydrohalic acid which then serves as a catalyst for further hydrolysis. The mineral acids that are used as hydrolysis catalysts for less readily hydrolyzable radicals such as alkoxy and aroxy radicals include hydrochloric, sulfuric and phosphoric, hydrochloric usually being preferred. The amount of hydrolyzing solution that is used includes at least enough water to effect complete hydrolysis of the silanes (i. e., at least one gram mol of water for every two gram atoms of hydrolyzable radicals in the silanes to be hydrolyzed). When the mixture of silanes contains hydrolyzable radicals that are halo radicals, it is usually advantageous to use an excess of water, e. g., from 5 to 10 gram mols for every two gram atoms of hydrolyzable radicals, in order to dilute the hydrohalic acid that is formed, but it is ordinarily not advantageous to use more than about 20 gram mols of water for every two gram atoms of hydrolyzable radicals.

When a mixture comprising a secondary alkyl (or aralkyl) trichlorosilane and silicon tetrachloride is hydrolyzed in the production of an organosiloxanol of the invention having an $r$/Si ratio higher than 0.6, it is necessary to conduct the hydrolysis in the presence of certain solvents in order to avoid gelling of the products of the hydrolysis. Suitable solvents include any alcohol which is substantially insoluble in water but has some miscibility in water (e. g., 1-propanol, 1-butanol or a higher primary aliphatic alcohol having up to eight carbon atoms, or mixtures thereof) used in admixture with any aromatic hydrocarbon which is ordinarily employed as a solvent for silanes (e. g., benzene, toluene or xylene) or mixtures thereof. In general, about equal parts by volume of the aromatic hydrocarbon (preferably toluene) and alcohol (preferably 1-butanol) are used, and usually it is desirable initially to divide the aromatic hydrocarbon solvent equally between the silane mixture and the hydrolyzing solution. (It is believed that the partially miscible alcohol solvent avoids confining the hydrolysis of chlorine atoms attached to silicon atoms to an interphase (between water and a solvent insoluble in water) at which there is an insufficiency of water which results in the rapid formation of

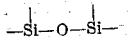

bonds and subsequent gelling.) An aromatic hydrocarbon such as toluene acts as a diluent to prevent local high concentration of silicon tetrachloride and resultant gelation. (Toluene is insoluble in water and cannot be used alone without causing the reaction to take place at an interphase between the toluene and the water.) Higher ketones such as methylisobutylketone, methylisoamylketone and amylethylketone, and esters such as butyl acetate, may also be used as solvents for the silanes without danger of gelling of the hydrolysis products. (A higher ketone, or ester such as butyl acetate, is sufficiently miscible with water that it prevents the reaction from taking place at an interphase, but requires no diluent for the silanes since it does not react with the silanes as an alcohol does.)

A mutual solvent (i. e., a solvent for both the hydrolyzing solution and the silanes) which is used for the carefully controlled hydrolysis of a silane mixture containing less readily hydrolyzable radicals than halo radicals may be a lower ketone (e. g., acetone, methylethylketone or diethylketone) or a lower alcohol (e. g., ethanol, 1-propanol or 1-butanol).

It is usually desirable to use a substantial amount of a solvent or solvents for just the silanes (e. g., from about 100 to about 300 ml. of solvents per gram mol of silanes, or even more when the silane mixture is particularly easy to hydrolyze), although for silane mixtures that are hydrolyzable only with comparative difficulty (e. g., a mixture comprising a secondary alkyl (or aralkyl) triethoxysilane and ethyl orthosilicate), with which a mutual solvent is preferred, considerably less solvent may be used (e. g., approximately 70 ml. per gram mol of silanes).

It has been found that the hydrolysis is usually substantially complete within from about 5 to about 10 minutes after the addition of the silane to the hydrolyzing solution has been completed. Apparently, leaving the silane in contact with the hydrolyzing solution for longer periods of time has no deleterious effect on the resulting products.

When a two-phase hydrolysis reaction has been conducted (i. e., using a solvent or mixture of solvents for just the silanes, as, for example, in hydrolyzing a mixture comprising a secondary alkyltrichlorosilane and silicon tetrachloride), the silane layer is allowed merely to separate from the water layer (e. g., in a separatory funnel), and the water layer is drawn off.

When the hydrolysis reaction is conducted with a mutual solvent and is considered to be approximately complete, the mixture of liquids is separated into two components (e. g., by solvent extraction using a solvent which is not miscible with water, such as diethyl ether). It is usually preferable then to extract the water layer again. It is most desirable, however, to use only the amount of water theoretically required to hydrolyze all of the silanes so that a separation into two components is not necessary.

The solution of hydrolyzed silanes may then be distilled at atmospheric pressure to remove solvent and residual water. The solvent is assumed to be substantially removed when the temperature of the solution in the vessel rises materially above the boiling temperature of the solvent. It is usually desirable, after the solvent is considered to be substantially removed, to maintain the temperature of the distillation vessel at about the boiling temperature of the solvent, and to reduce the absolute pressure to about 5 inches of mercury for about 10 minutes in order to eliminate the last trace of solvent. The present resins are bodied by heating at temperatures between about 220 and about 240 degrees C. (usually under reduced pressure to facilitate removal of water of condensation). The length of time for which the resin is bodied depends, of course, upon the properties of the resin, but ordinarily from about one to about three hours is sufficient to obtain a substantially tack-free resin of a suitable viscosity for use as a coating composition.

The stable coating compositions embodying the invention form water-repellent coatings of superior permanency, and are particularly useful in the present method of waterproofing porous ceramic materials.

*Porous ceramic material*

The term "ceramic materials" includes all products which are manufactured entirely or chiefly from raw materials of an earthy nature, as distinguished from those of a metallic or organic nature, and in whose manufacture a high-temperature treatment is involved. The present method of waterproofing is applicable to porous ceramic materials, the word "porous" being used herein to mean a material having sufficient porosity that upon standing in one-quarter inch of water at room temperature for 24 hours it absorbs more than 1 per cent of its weight in water.

Thus, the term "porous" distinguishes ceramic materials to which the present method is applicable from glazed ceramic materials which may be classified as glass, pottery or enameled metals. Porous ceramic materials include: structural ceramics such as common brick, paving brick, face brick, sewer pipe, drain tile, hollow block, terra cotta, conduits, roofing tile, and flue lining; cements and plastics such as portland cement, calcined gypsum products (i. e., molding and building plaster and stucco), and magnesia cement; and insulation products such as electrical insulators (porcelain spark plugs, etc.) and thermal insulators (diatomaceous earth brick). The present method is most applicable to masonry, i. e., to all artistic and architectural structures of such porous ceramic materials as stone, brick, tiles, artificial stone, adobe, etc., and to ceramic articles, particularly masonry units (i. e., bricks, pieces of stone, etc.), which in masonry are generally held together or made a single mass by mortar, plaster or earth. The porous ceramic materials should be dry when treated with a waterproofing composition by the present method.

Method of waterproofing

In accordance with the present method, a water-repellent coating is formed on a porous ceramic material by applying a volatile solvent solution of an organosiloxanol, as hereinbefore defined, to the surface of the porous ceramic material, and drying. The solution may be applied by any convenient method, such as spraying, brushing or dipping. The volatile solvent serves the same function in a waterproofing composition of the invention as the solvent in any resinous coating composition, i. e., it dilutes the composition so that it can be readily applied by spraying, brushing, or dipping or any of the usual methods of application. In general, the amount of solvent should be sufficient to dilute the siloxanol solution to a concentration of from about 0.75 to about 15 per cent solids, and preferably from about 1 to about 10 per cent solids. It is most desirable that the solids content of an organosiloxanol composition used in the present method be from about 1.5 to about 2.5 per cent. (Thus, solutions of compositions of the invention not only have superior stability which increases the permanency of water-repellent coatings produced from such compositions, but also are highly economical to use as waterproofing agents since they are effective in such low concentrations.) Solutions of higher concentration should be avoided, not only because it is impractical to use them from the standpoint of economy, but also because a solution of high concentration may form a thick coating which may seal the pores of a ceramic material such as masonry and prevent "breathing" of the masonry. Evaporation of water from the surface, i. e., "breathing" or transpiration, is believed to be important in maintaining the integrity of ceramic materials, particularly masonry structures. For example, if through a break in the mortar water gets into a masonry structure whose pores are sealed, the structure may crack when the temperature drops below freezing, since the water cannot escape by evaporation through the pores at the surface of the masonry. A coating applied to a porous ceramic material in accordance with the present method does not seal the pores of the material but penetrates the pores to form a water-repellent coating therein, and thus does not prevent the free passage of water vapor through the material. Water in its liquid form, however, cannot readily penetrate pores having a highly water-repellent coating. Thus, a ceramic article embodying the invention which has been rendered water-repellent in accordance with the present method is still porous and is capable of "breathing."

For example, a common sand mold brick which was treated on one flat side and on the four edges with a solution of a composition of the invention (the composition hereinbefore referred to as "A") by the procedure hereinbefore described, was weighed and then permitted to remain with the untreated side down in a trough containing water at a depth of one-quarter inch for twenty-four hours. At the end of this period, the brick was removed from the trough, wiped free of superficial moisture, and weighed to determine the per cent of its weight in water that the brick had absorbed. The brick was then placed with the untreated side down on a rubber sheet. After 144 hours the brick was weighed to determine the rate of loss of moisture (transpiration rate) through the water-repellent coating. Although the brick originally absorbed 13.9 per cent of its weight in water, the coating permitted sufficient evaporation of this water so that at the end of 144 hours, the per cent of absorbed water remaining in the brick was 3.65 per cent. Thus, vapors may pass through coatings produced from compositions of the invention, and the coatings may be used without danger of the difficulties that arise from coatings which seal pores and prevent "breathing" of porous ceramic materials.

The fact that a water-repellent coating applied to a porous ceramic material in accordance with the present method penetrates the pores of the material has been demonstrated as follows: A common sand mold brick was coated on all six sides with a solution of the composition of the invention hereinbefore referred to as "A." The brick was broken in half, and immersed in a pan of water for a few hours the uncoated broken surface down. Examination of the brick upon removal from the water showed that the entire cross-section of the brick except for a narrow (about ⅛ inch) margin around the cross-section of the brick was dark from the impregnation of water. The narrow margin around the cross-section of the brick was dry because the organosiloxanol solution had penetrated the pores of the brick and thus prevented the passage of liquid water into the coated pores.

In Figures I, II, III and IV the portion 4 of a porous ceramic material which contains only the amount of water vapor that is normally breathed from the atmosphere through the pores is indicated by the absence of dashed lines. A high concentration of liquid water is represented by more dense dashed lines 2 and a high concentration of water vapor is represented by less dense dashed lines 3. Thus, Figure I shows that in an ordinary building foundation, a layer 2 of liquid water penetrates the portion that is adjacent a moisture source (i. e., the earth) and that although this layer of liquid water diminishes gradually as the distance from the moisture source increases (some of it vaporizes though the pores that are not adjacent the moisture source) to form a surrounding layer 3 of highly concentrated water vapor, so much liquid water is able to penetrate the foundation that a layer of actual water 2 is retained in the interior of the foundation material.

On the other hand, as shown in Figure II, liquid moisture from the earth 1 cannot penetrate a foundation which has been treated with a water-repellent coating 5 in accordance with the present method. Although a light layer of highly concentrated water vapor exists at the points of direct contact of the earth with the foundation, the water-repellent coating prevents penetration of liquid water into the foundation material. The foundation material treated in accordance with the present method is still porous so that the light vaporous layer 3 "breathes off" through the pores of the foundation material and is not retained in the material.

An important embodiment of the present invention is a porous ceramic article, particularly a masonry unit, which has been treated in accordance with the present method. The advantages in the use of masonry units which have been rendered water repellent before they are used in masonry construction are readily apparent. For example, during the construction of masonry in hot, dry climates, it is necessary ordinarily to keep wetting the newly erected masonry in order to prevent the masonry units from drawing moisture from the mortar (such withdrawal of moisture would prevent the mortar from setting properly). The use of water-repellent masonry units embodying the invention eliminates the necessity for keeping the units wet, for the water from the mortar is no longer soaked up by the water-repellent masonry units, and the only loss of water is the small amount which evaporates at the edges of the mortar joints, this slight loss taking place so slowly as not to interfere with the setting of the mortar. As shown in Figure III, water from a moisture source 1a (i. e., mortar) readily penetrates ordinary masonry units. The high concentration of liquid water 2 at the mortar joint diminishes gradually as the distance from the joint increases (some of it vaporize through the pores that are not adjacent the moisture source) to form a layer of highly concentrated water vapor, but some moisture impregnates nearly the whole masonry unit and is retained in the interior of the unit. On the other hand, as shown in Figure IV, liquid moisture from mortar cannot penetrate masonry units which have been treated with a water-repellent coating 5 in accordance with the present method. No liquid water is soaked into the masonry units and the light layer of highly concentrated water vapor which forms at the mortar joints evaporates through the pores of the masonry and does not remain in the interior of the units.

The amount of a volatile solvent solution of an organosiloxanol required to form a water-repellent coating upon a porous ceramic material depends, of course, upon the porosity of the ceramic material and the severity of the weathering conditions to which the material is exposed. In general, the maximum required amount of a solution having a solids concentration within the preferred ranges hereinbefore described is not more than about one gallon per 25 square feet of area, and usually it is not more than one gallon per 75 to 100 square feet of area. In some cases as little as one gallon per 200 square feet may be highly effective, although usually it is preferable to apply not less than one gallon per 125 square feet. Such limitations are, of course, arbitrary and may be varied widely when the ceramic materials employed are relatively dense or extremely porous, the optimum amounts of waterproofing resin solution in such cases being best determined by experiment. In any event, the coating compositions employed in the present method have such good penetrating power that a single coat is sufficient to impart excellent water-repellency. In contrast, aluminum stearate solutions, which have been among the best waterproofing agents heretofore known, do not penetrate a porous ceramic material and are absorbed too slowly to be effective when applied in a single coat. That is, since an aluminum stearate solution does not penetrate the pores of a ceramic material, a single coat is soon worn off the material. Furthermore, a coating of aluminum stearate cannot be applied to a porous ceramic material in cool weather, e. g., at temperatures below 50 degrees F., because a solution of aluminum stearate at lower temperatures tends to be so stiff and gel-like that it does not have even the slight penetrating power that it has when applied at higher temperatures.

As hereinbefore demonstrated, a single application of a water-repellent coating produced from a composition of the invention has greater permanency when exposed to outdoor weathering conditions than two coats of an aluminum stearate waterproofing solution. In general, a coating produced from a composition of the invention forms a continuous flexible film that prevents the ingress of any appreciable amount of water into a porous ceramic material to which it is applied. Furthermore, the flexibility of a film of a composition of the invention deposited in the crevices of a porous ceramic material (e. g., masonry units such as brick or stone) allows expansion and contraction of the material in hot and cold weather without cracking of the film. Although alkylsiloxanol compositions in which the alkyl radicals attached to silicon atoms comprise only primary alkyl radicals having from three to nine carbon atoms may be applied to porous ceramic materials to form coatings which like the present coatings have excellent water-repellency and are capable of penetrating a porous ceramic material, such coatings do not have the superior permanency of coatings produced from the present compositions. As hereinbefore discussed, compositions produced from alkylsilanes in which the alkyl radicals comprise only primary alkyl radicals cannot be bodied to a substantially cured state without danger of gelling, so that coatings produced from such compositions, over a period of exposure to outdoor weathering conditions, may become brittle and crack by reason of gradual further condensation in the coatings. Organosiloxanol compositions of the invention in which the alkyl (or aralkyl) radicals attached to silicon atoms comprise secondary alkyl radicals can be bodied without danger of gelling to form compositions which are substantially stable to further condensation. Coatings on porous ceramic materials produced from such compositions last indefinitely upon exposure to severe weathering conditions without becoming brittle and disintegrating, since further condensation of the compositions is arrested before they are even applied as coatings.

The solvent in which an organosiloxanol composition of the invention is used in the present method of waterproofing should be sufficiently volatile to permit the water-repellent coating applied to a porous ceramic material to harden in place, before it has a chance, in its diluted, low viscosity state, to run down and thus form an uneven coating upon the ceramic material. Ordinarily it is most desirable that the solvent evaporate within about twenty-four hours, although a solvent which evaporates within about one week is considered volatile.

The volatile solvent solution of an organosiloxanol employed in the present method may contain a pigment (or pigments) suspended therein (i. e., the waterproofing solution may be a paint composition). Ordinarily the resin solids concentration in such a composition is within the upper part of the ranges hereinbefore described and the proportion of pigment is approximately equal in weight to the proportion of resin solids in the volatile solvent solution. In the case of a waterproofing composition used in the present method which contains a pigment, the volatility of the solvent should be sufficiently great so as to prevent "flooding" of the pigment (i. e., a change in color at the surface of the paint film caused by a concentration at the surface of the paint film of one of the ingredients of the pigment portion).

All of the solvents hereinbefore described which may be used in the preparation of organosiloxanols embodying the invention are suitable solvents in which to apply such resins in the waterproofing of porous ceramic materials by the present method. Although such solvents usually are removed during the bodying of the resins, they may be replaced when the resins have been cured to the desired viscosity. Other suitable volatile solvents include, for example, ethers, such as diethyl, ethylpropyls, dipropyls and propylbutyls and cyclic ethers such as dioxane. However, it is ordinarily more practical to apply the present compositions in a less expensive solvent such as an aromatic hydrocarbon (e. g., xylene or toluene) or a petroleum solvent (e. g., "Varnolene"). A "Mineral Spirits" type of solvent, e. g., "Varnolene," is preferred even though it takes as long as a week to evaporate because an aromatic hydrocarbon, e. g., xylene or toluene, has a tendency to penetrate a porous ceramic material too deeply. (In addition to their superior permanency, the present compositions have a further advantage over siloxanol compositions in which the alkyl radicals attached to silicon atoms comprise only primary alkyl radicals in that the solvent in which they are prepared may be removed without danger of gelling and replaced with a less expensive solvent. Furthermore, primary alkylsiloxanols of an r/Si ratio below 0.6 tend to be unstable in non-polar solvents.)

The coating compositions embodying the invention not only are useful in the present method of waterproofing porous ceramic materials, but also are highly effective as waterproofing agents for paper, leather and textiles. For example, a very dilute solution or emulsion (approximately 1 to 5 per cent solids concentration) of an organosiloxanol composition of the invention which is highly bodied to a tack-free state may be applied to paper or leather in accordance with any standard method employed in the art of coating such materials. It is not necessary to cure the coatings but simply to permit the coated material to dry at room temperature or at a lower temperature. The resulting coated paper or leather has excellent water-repellency. A highly concentrated solution of an organosiloxanol of the invention (e. g., 40 to 60 per cent solids concentration) is useful as an electrical insulating varnish for paper. Paper coated with such a varnish does not crack and has good electrical properties which make it useful in many applications, for example as a cable wrap.

The following examples illustrate the practice of the invention:

*Example 1*

Coating compositions embodying the invention may be prepared by the following procedures:

(a) A mixture of a sec.-amyltrichlorosilane (123 grams, prepared by the procedure hereinbefore described), phenyltrichlorosilane (42 grams), silicon tetrachloride (34 grams) and butyl acetate (300 ml.) is added dropwise from a dropping funnel to water (500 ml.) contained in a 4-liter beaker surrounded with ice water which cools the beaker to a temperature between 0 and 5 degrees C. The mixture in the beaker is stirred during the addition, and the rate of addition is adjusted so that the temperature of the mixture in the beaker never rises higher than 5 degrees C. When the addition from the dropping funnel, which requires approximately one hour, is complete, the resinous layer is separated from the water layer in a separatory funnel, and the water layer is drawn off. The resin is placed in a Claisen flask and distilled to remove the solvents and water. The resin is then bodied under reduced pressure at temperatures ranging between 220 and 250 degrees C. for approximately three and one-half hours. The resulting resin is soft and gum-like.

(b) A mixture of alpha-(dichlorophenyl)-ethyltrichlorosilane (97 grams), ethyltrichlorosilane (80 grams), silicochloroform (27 grams) and butyl acetate (250 ml.) is added dropwise from a dropping funnel to water (500 ml.) contained in a 4-liter beaker surrounded with ice water which cools the beaker to a temperature between 0 and 10 degrees C. The alpha-(dichlorophenyl)-ethyltrichlorosilane is prepared by the following procedure: Alpha-chloroethyltrichlorosilane (445 grams) and o-dichlorobenzene (660 grams) are placed in a 2 liter three-necked flask fitted with a stirrer and a reflux condenser. Aluminum chloride (1.5 grams, i. e., about ⅓ of the total amount of 4.5 grams to be added) is added and the mixture is stirred and heated at gentle reflux until evolution of HCl commences. The mixture is refluxed for two hours during which period the remainder of the aluminum chloride is added in two portions of 1.5 grams each, the refluxing being discontinued during the additions of the aluminum chloride. Heat is then removed and phosphorus oxychloride (about 5 grams) is added to complex the aluminum chloride. The mixture is then allowed to stand overnight. The liquid is then decanted from the mixture and is filtered. The filtrate is placed in a Claisen flask and is distilled under reduced pressure to obtain an alpha-(dichlorophenyl)-ethyltrichlorosilane, B. P. 150–155 degrees C. at 1 mm. Hg. The mixture in the beaker is stirred during the addition, and the rate of addition is adjusted so that the temperature of the mixture in the beaker does not rise above 10 degrees C. The resin layer is separated from the water layer and is washed once with salt water (100 ml.). The resin is then dried over anhydrous sodium sulphate.

When an equivalent amount of any of the following secondary alkyltrichlorosilanes is substituted for the secondary amyltrichlorosilane used in the procedure described in (a) above, another resin of the invention is obtained: isopropyltrichlorosilane, a secondary-hexyltrichlorosilane or a secondary nonyltrichlorosilane.

The solids concentration of a resin prepared as described in (a) above, or a resin prepared as described in (b) above and bodied for ten or fifteen minutes at a temperature of about 220 degrees C., may be adjusted with a solvent such as "Varnolene" to within a range of about 1.5 to 2.5 per cent. A single coat of either of the resulting solutions may be applied to a porous ceramic material (e. g., a wall of unit masonry construction) in accordance with the present method to produce a coating which remains highly water-repellent under exposure to severe weathering conditions over relatively long periods of time.

*Example 2*

A water-repellent porous ceramic article embodying the invention may be prepared as follows:

Cement bricks are allowed to stand for at least one week in a conditioning room in which the temperature is 70 degrees F. and the relative humitidy is 50 per cent. The bricks are then brushed clean of loose particles and are treated on all six sides with a coating composition of the invention prepared by the same procedure as the composition hereinbefore referred to as "A" except that the composition is diluted with "Varnolene" to a solids content of 2.5 per cent. The solution is applied to the bricks using a paint brush one and one-half inches wide, the coverage being equivalent to about 50 square feet of surface per gallon. The coated bricks are permitted to dry at room temperature for at least one week. The dried coatings impart excellent water-repellency to the bricks and last indefinitely upon exposure to severe weathering conditions.

The water-repellency of the cement bricks treated in accordance with the procedure described in the preceding paragraph is tested as follows: Ten of the coated bricks are weighed and then placed with one of the flat treated sides down in a trough containing water at a depth of one-quarter inch. At the end of four hours, the bricks are removed from the trough, wiped free of superficial moisture, and weighed. They are then returned to the trough for an additional twenty hours, removed and reweighed. From the increase in weight of each brick, the water absorbed by the brick after four hours and after twenty-four hours is calculated, as percent of its former weight. The average of the ten results is .222 per cent of water absorbed after four hours and .420 per cent after twenty-four hours. Bricks which are treated with "Driwal" or with "Crystal" by the same procedure have considerably less water-repellency, even when two coats of the "Driwal" are used. For example, the average of the results obtained on ten cement bricks each treated with two coats of "Driwal" is .874 per cent of water absorbed after four hours and 3.07 per cent of water absorbed after twenty-four hours. The average of the results obtained on ten cement bricks each treated with one coat of "Crystal" is 3.81 per cent of water absorbed after four hours and 5.51 per cent of water absorbed after twenty-four hours.

I claim:

1. A coating composition of improved stability that forms water-repellent coatings of superior permanency, comprising a siloxanol whose molecules consist of silicon atoms to which are attached (1) OH groups, (2) oxygen linkages connecting silicon atoms, and (3) secondary amyl radicals, any additional radicals attached to the silicon atoms being (4) primary alkyl radicals having from one to six carbon atoms, the average number of the radicals (4) attached to each silicon atom being from 0 to 0.9, the average number of the radicals (3) attached to each silicon atom being from 0.3 to 0.75, the average total number of the radicals (3) and (4) attached to each silicon atom being not greater than 1.2, and not less than 30 per cent of said silicon atoms having the radicals (3) attached thereto.

2. A coating composition as claimed in claim 1 wherein the average number of the radicals (4) attached to each silicon atom is from 0 to 0.4, the average number of the radicals (3) attached to each silicon atom is from 0.5 to 0.7, the average total number of the radicals (3) and (4) attached to each silicon atom is not greater than 0.9, and wherein not less than 50 per cent of said silicon atoms have the radicals (3) attached thereto.

3. A method of waterproofing porous unglazed ceramic materials that comprises forming a water-repellent coating thereon by applying a volatile solvent solution of a siloxanol whose molecules consist of silicon atoms to which are attached (1) OH groups, (2) oxygen linkages connecting silicon atoms, and (3) secondary amyl radicals, any additional radicals attached to the silicon atoms being (4) primary alkyl radicals having from one to six carbon atoms, the average number of the radicals (4) attached to each silicon atom being from 0 to 0.9, the average number of the radicals (3) attached to each silicon atom being from 0.3 to 0.75, the average total number of the radicals (3) and (4) attached to each silicon atom being not greater than 1.2, and not less than 30 per cent of said silicon atoms having the radicals (3) attached thereto, and drying.

4. A method of waterproofing porous unglazed ceramic materials as claimed in claim 3 wherein the average number of the radicals (4) attached to each silicon atom is from 0 to 0.4, the average number of the radicals (3) attached to each silicon atom is from 0.5 to 0.7, the average total number of the radicals (3) and (4) attached to each silicon atom is not greater than 0.9, and wherein not less than 50 per cent of said silicon atoms have the radicals (3) attached thereto.

5. A method of waterproofing as claimed in claim 3 wherein the solution is applied to masonry.

6. A coating composition of improved stability that forms water-repellent coatings of superior permanency, comprising a solution in a volatile organic solvent of a siloxanol whose molecules consist of silicon atoms to which are attached (1) OH groups, (2) oxygen linkages connecting silicon atoms, and (3) secondary amyl groups, any additional radicals attached to the silicon atoms being (4) ethyl radicals, the average number of the radicals (4) attached to each silicon atom being from 0 to 0.4, the average number of the radicals (3) attached to each silicon atom being from 0.5 to 0.7, the average total number of the radicals (3) and (4) attached to each silicon being not greater than 0.9, and not less than 50 per cent of said silicon atoms have the radicals (3) attached thereto.

7. A method of waterproofing porous masonry materials that comprises forming a water-repellent coating thereon by applying a volatile organic solvent solution of a siloxanol whose molecules consist of silicon atoms to which are attached (1) OH groups, (2) oxygen linkages connecting silicon atoms, and (3) secondary amyl radicals, any additional radicals attached to the silicon atoms being (4) ethyl radicals, the average number of the radicals (4) attached to each silicon atom being from 0 to 0.4, the average number of the radicals (3) attached to each silicon atom is from 0.5 to 0.7, the average total number of the radicals (3) and (4) attached to each silicon atom is not greater than 0.9, and not less than 50 per cent of said silicon atoms having radicals (3) attached thereto, and drying.

References Cited in the file of this patent

UNITED STATES PATENTS

| Number | Name | Date |
|---|---|---|
| 2,486,162 | Hyde | Oct. 5, 1949 |
| 2,505,431 | Rust et al. | Apr. 25, 1950 |
| 2,521,673 | Britton et al. | Sept. 16, 1950 |
| 2,574,168 | Brick | Nov. 6, 1951 |

FOREIGN PATENTS

| Number | Country | Date |
|---|---|---|
| 290,717 | Great Britain | May 16, 1928 |

OTHER REFERENCES

Rochow, Chemistry of the Silicones, Wiley, 1946, pp. 83 to 88 and 112.

The Chemical Age, February 26, 1949, pp. 322 to 326.